United States Patent [19]

Sturgill et al.

[11] Patent Number: 5,972,073
[45] Date of Patent: Oct. 26, 1999

[54] RECOVERY OF THE COMPONENTS OF GROUP III-V MATERIAL AQUEOUS WASTES

[75] Inventors: Jeffrey Allen Sturgill, Fairborn; Joseph Thomas Swartzbaugh, Phillipsburg, both of Ohio

[73] Assignee: The University of Dayton, Dayton, Ohio

[21] Appl. No.: 08/942,851

[22] Filed: Oct. 2, 1997

[51] Int. Cl.$^6$ .......................... C22B 30/00; C22B 58/00
[52] U.S. Cl. ............................... 75/404; 75/407; 75/688; 75/706; 75/712; 75/739; 423/87; 423/111; 423/157.5
[58] Field of Search ........................... 75/404, 407, 688, 75/706, 712, 739; 423/87, 111, 157.5

[56] References Cited

U.S. PATENT DOCUMENTS

| | | | |
|---|---|---|---|
| 2,867,526 | 1/1959 | Heath et al. | 423/148 |
| 2,890,139 | 6/1959 | Shockley | 75/10.11 |
| 4,094,753 | 6/1978 | Charlton et al. | 423/122 |
| 4,201,667 | 5/1980 | Liao | 210/721 |
| 4,244,734 | 1/1981 | Reynolds et al. | 75/724 |
| 4,332,687 | 6/1982 | Daignault et al. | 210/721 |
| 4,339,302 | 7/1982 | Faktor et al. | 75/407 |
| 4,362,560 | 12/1982 | Abrjutin et al. | 75/407 |
| 4,489,046 | 12/1984 | Petersson et al. | 423/88 |
| 4,808,221 | 2/1989 | Clement, II et al. | 423/88 |
| 4,812,167 | 3/1989 | Inooka | 75/688 |
| 4,965,054 | 10/1990 | Lewis | 423/112 |
| 5,110,353 | 5/1992 | Li et al. | 75/703 |
| 5,114,592 | 5/1992 | Schuster et al. | 210/667 |
| 5,221,525 | 6/1993 | Bradbury et al. | 75/722 |
| 5,348,662 | 9/1994 | Yen et al. | 210/717 |
| 5,358,643 | 10/1994 | McClintock | 210/709 |
| 5,370,800 | 12/1994 | Stevenson | 210/710 |
| 5,378,366 | 1/1995 | Yen | 210/667 |
| 5,458,669 | 10/1995 | Maeda et al. | 75/688 |
| 5,518,633 | 5/1996 | Brown et al. | 210/713 |

FOREIGN PATENT DOCUMENTS

| | | |
|---|---|---|
| 261397 | 11/1989 | Czech Rep. . |
| 210 809 | 6/1984 | Germany . |
| 2-15128 | 1/1990 | Japan . |

OTHER PUBLICATIONS

Bird et al., "Production of High–Purity Gallium From Scrap Gallium," *Hydronet Copper, Its Byprod. Rarer Met.*, Proc. Dallas Symp, pp. 59–64, 1982.

Yamashita et al, "Recovery of Individual Metals from Gallium–Arsenic–Indium Semiconductor Wastes by Flotation," *Anal. Sci.* vol. 6, pp. 783–784, 1990.

Jadvar et al., "Recovery of Gallium and Arsenic from GaAs Wafer Manufacturing Slurries," *Env. Progress* vol. 10, No. 4, pp. 278–281, 1991.

Chem. Abst. 86:93620r (East German Patent No. 120.861).
Chem. Abst. 90:107507f (U.S. Pat. No. 4,094,753).
Chem. Abst. 95:46865a (Can. Pat. No. 1,094,328).
Chem. Abst. 102:169190x (Jpn. Pat. No. 59,213,622).

(List continued on next page.)

Primary Examiner—George Wyszomierski
Attorney, Agent, or Firm—Killworth, Gottman, Hagan & Schaeff, LLP

[57] ABSTRACT

The present invention is directed to a method for separating the group III element component of a group III-V material from an aqueous waste containing a group III-V material to allow for their recovery and beneficial use. The method includes adjusting the pH of an aqueous waste containing a group III-V material to a pH from about 9.5 to about 12.5 by adding an alkali metal hydroxide base to the aqueous waste; precipitating a group V element oxyanion by adding a soluble alkaline metal salt to the aqueous waste; separating the group V element oxyanion from the aqueous waste; adjusting the pH of the aqueous waste to form a group III element hydroxide precipitate by adding a mineral acid to the aqueous waste; separating the group III element hydroxide precipitate from the aqueous waste; and recovering the group III element from the group III element hydroxide precipitate.

42 Claims, 3 Drawing Sheets

OTHER PUBLICATIONS

Chem. Abst. 102:188619k (Jpn. Pat. No. 60 27,613).
Chem. Abst. 103:9557q (Jpn. Pat. No. 60 24,331).
Chem. Abst. 105:82977x (Jpn. Pat. No. 61 76,627).
Chem. Abst. 109:194374n (U.S. Patent No.4,759,917).
Chem. Abst. 109:153569m (Bartlett, "Separation of Arsenic and Gallium form Mixed Gallium Arsenide Electronic Scrap," *Arsenic Metall. Fundam. Appl.*, Proc. Symp. 1988: 385–400.
Chem. Abst. 110:177133m (Jpn. Pat. No. 63,270,425).
Chem. Abst. 110:177134n (Jpn. Pat. No. 63,270,426).
Chem. Abst. 110:177135p (Jpn. Pat. No. 63,270,427).
Chem. Abst. 110:177136q (Jpn. Pat. No. 63,270,428).
Chem. Abst. 110:177137r (Jpn. Pat. No. 63,270,430).
Chem. Abst. 110:177138s (Jpn. Pat. No. 63,270,431).
Chem. Abst. 110:177159z (Jpn. Pat. No. 01 04,433).
Chem. Abst. 111:100788s (Jpn. Pat. No. 01 47,825).
Chem. Abst. 112:220719n (Jpn. Pat. No. 01 191,753).
Chem. Abst. 112:150111g (Jpn. Pat. No. 01 179,712).
Chem. Abst. 120:328097n (Jpn. Pat. No. 06 65,658).

RECOVERY OF THE COMPONENTS OF GROUP III-V MATERIAL AQUEOUS WASTES

STATEMENT REGARDING FEDERALLY-SPONSORED RESEARCH OR DEVELOPMENT

The United States Government has rights in this invention pursuant to Contract No. CR 82 180808-01-0 awarded by the United States Environmental Protection Agency.

BACKGROUND OF THE INVENTION

The present invention relates to a process for separating the elemental group III component of a group III-V material from aqueous polishing or etching wastes generated during the manufacture of group III-V material semiconductor devices.

Semiconductor devices formed from group III-V materials, such as, for example, gallium arsenide, gallium phosphide and indium phosphide, are used for a multitude of military and commercial devices in the United States and throughout the world. Typically, these uses include lasers, light-emitting diodes, and communications equipment. Manufacturing processes devoted to the fabrication of these devices generate large volumes of wastes which contain valuable gallium metal and indium metal. For example, gallium is particularly expensive and currently sells for about one dollar per gram. For that reason, low-cost procedures devoted to the recovery of these metals are economically advantageous to semiconductor manufacturers.

Manufacturers grow bulk crystals of group III-V materials in large boules or ingots. These boules are then cut into wafers, and etched and lapped to remove any surface damage. The wafers are then polished to achieve a mirror-like finish on one or both sides of the wafer. To polish the wafers, the wafers are mounted onto polishing plates, and either a wax or a vacuum is used to hold them in place. The polishing plates are then mounted on a polisher and are pressed against an abrasive polishing pad. The polishing is done "wet." In a "wet" polishing process, a very fine polishing agent, such as alumina, and an agent containing an oxidizing species are used to remove surface materials through a combination of mechanical and chemical action.

Use of the oxidizing species results in solubilized metal ions according to, for example, the following generalized reactions:

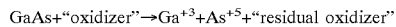
$$GaAs + \text{"oxidizer"} \rightarrow Ga^{+3} + As^{+5} + \text{"residual oxidizer"}$$

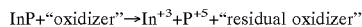
$$InP + \text{"oxidizer"} \rightarrow In^{+3} + P^{+5} + \text{"residual oxidizer"}$$

A number of chemical oxidizers have been used in the laboratory and in industry to polish group III-V semiconductor materials. In general, it is desirable to utilize chemical species which aid the polishing operation by oxidizing group V elements, such as arsenic or phosphorous, to the water-soluble +5 valence state, because the use of acids (without oxidizer) leads to the generation of toxic gases, such as arsine ($AsH_3$) or phosphine ($PH_3$). The most commonly used oxidizer species are hydrogen peroxide, chlorinated compounds (especially hypochlorite), and nitric acid. Typical concentrations of oxidizer, depending on the oxidizer species, of 10% to 30% are used during a polishing operation.

This wet polishing process produces an aqueous waste stream that contains from 200 to 400 ppm each of dissolved group III elements and group V elements, as well as residual oxidizer concentrations of from about 3% to about 10%. At such concentrations, the aqueous wastes from group III-V material semiconductor wafer polishing require subsequent treatment for removal of toxic materials, such as arsenic, prior to discharge of the aqueous waste from the manufacturing plant. The aqueous waste itself has a "milky" appearance, due to large concentrations of very fine polish particles, having sizes of 0.5 micron and smaller, suspended within it. While some of the suspended polish settles after time, most remains suspended in the aqueous polishing solution providing the milky appearance and complicating any separation processes. The pH of the aqueous waste is dependent upon the initial oxidizer solution used, but the resultant aqueous waste is generally more basic than the initial solution, due to a number of factors such as, for example, the presence of polish and generation of soluble group III element ions. Typically, these aqueous wastes have a pH near the neutral region.

Currently, aqueous wastes containing group III-V materials are treated with a soluble ferric iron species (e.g., ferric chloride or ferric nitrate) which is added to the aqueous waste. The pH of the aqueous waste is then adjusted so as to precipitate insoluble ferric hydroxide. The group III element ions and the group V element ions are "co-precipitated" with the ferric hydroxide. Coagulating and flocculating agents are added to aid in the physical removal of the resultant precipitate. This process produces a large volume of waste solids which must be disposed of, and which could readily leach toxic metals, such as arsenic, in a land-disposal environment. The colloidal nature of the polishing agent also complicates the physical separation process. For this reason, it is difficult to obtain consistent metal concentrations in the discharged filtrate on a day-to-day basis. Consistent metal concentrations in the aqueous waste are particularly important when the discharge contains toxic metals which are subject to environmental output regulations.

An additional concern with this conventional process is that the two materials for which recycling is desirable, the group III element and the group V element, are intimately mixed with a tremendous excess of a third material (iron). Therefore, recovery and recycling of the group III elements and the group V elements from the iron precipitate are extremely difficult. This, combined with the problems sometimes encountered with meeting toxic metal discharge limits for the filtrate, results in a need in the art for a method that not only recovers valuable components of group III-V materials, but does so in a way which treats for toxic components.

SUMMARY OF THE INVENTION

The present invention solves the existing needs in the art by providing a process that recovers valuable metals from aqueous wastes containing group III-V materials and also separates out toxic constituents. In this process, the pH of an aqueous waste containing dissolved group III-V material is adjusted to a pH from about 9.5 to about 12.5 by adding an alkali metal hydroxide base to the aqueous waste. A group V element oxyanion is then precipitated out of the aqueous waste to by adding a soluble alkaline metal salt to the aqueous waste. The group V element oxyanion is then separated out of the aqueous waste. Next, the pH of the aqueous waste is adjusted by adding a mineral acid to the aqueous etching waste to form a group III element hydroxide precipitate. The group III element hydroxide precipitate is then separated from the aqueous waste and the group III element is recovered from the group III element hydroxide precipitate.

It is desirable that the group V element oxyanion is separated from the aqueous waste by centrifuging because of the colloidal nature of the suspended solid material. The remaining separation steps are conducted by either centrifuging or filtering.

Another aspect of the present invention is directed to a method for the separation of the gallium component of gallium arsenide from an aqueous waste containing gallium arsenide. The pH of an aqueous waste containing gallium arsenide is adjusted to a pH from about 9.5 to about 12.5 by adding an alkali metal hydroxide base to the aqueous waste. An alkaline metal arsenate is precipitated by adding a soluble alkaline metal salt to the aqueous waste. The alkaline metal arsenate is then separated from the aqueous waste. The pH of the aqueous waste is then adjusted to a pH of from about 6 to about 8 to form a gallium hydroxide precipitate by adding a mineral acid to the aqueous waste. The gallium hydroxide precipitate is then separated from the aqueous waste. The gallium is then recovered from the gallium hydroxide precipitate by means of a reduction reaction. It is desirable that the alkaline metal arsenate be reduced to derive arsenic metal which can be recycled into the manufacturing process.

With this aspect of the invention, it is desirable that the alkaline metal arsenate is separated from the aqueous waste by centrifuging due to the colloidal nature of the suspended solid material. The remaining separation steps can be conducted by centrifuging or filtering.

Still another aspect of the present invention is directed to a method for the separation of the group III elemental component of a group III element phosphide from an aqueous waste containing a group III element phosphide. The pH of an aqueous waste containing a group III element phosphide is adjusted to a pH from about 9.5 to about 12.5 by adding an alkali metal hydroxide base to the aqueous waste. An alkaline metal phosphate is precipitated by adding a soluble alkaline metal salt to the aqueous waste. The alkaline metal phosphate is then separated from the aqueous waste. The pH of the aqueous waste is then adjusted to a pH of from about 6 to about 8 to form a group III element hydroxide precipitate by adding a mineral acid to the aqueous waste. The group III metal hydroxide precipitate is then separated from the aqueous waste and the group III metal is recovered from the group III metal hydroxide precipitate.

With this other aspect of the invention, it is desirable that the alkaline metal phosphate is separated from the aqueous waste by centrifuging due to the colloidal nature of the suspended solid material. The remaining separation steps can be conducted by centrifuging or filtering.

Thus, it is an object of this invention to provide a process which recovers valuable metals from aqueous wastes containing group III-V materials and also separates out toxic constituents. Other objects and advantages of the invention will be apparent from the following detailed description, the accompanying drawings and the appended claims.

DETAILED DESCRIPTION OF THE INVENTION

The method of the present invention is designed to recover valuable group III elements from an aqueous waste containing dissolved group III-V materials, such as, for example, gallium arsenide, gallium phosphide, gallium antimonide, indium arsenide, indium phosphide and indium antimonide. These aqueous wastes are generated during the production of group III-V materials and the production of materials formed from group III-V materials, such as semiconductor devices. As stated above, these aqueous wastes generally contain between about 200 ppm and 400 ppm each of a group III element and a group V element. The group III element and the group V element are typically solubilized and are in their highest oxidation states due to the addition of the oxidizing agent to the aqueous waste to prevent the formation of toxic compounds. The oxidizing agent is typically added in amounts of from about 10% to about 30% and usually is present in amounts of about 3% to 10% of the aqueous waste. The aqueous waste also includes micron-sized particles of polishing agents which are used to polish the group III-V materials. These micron-sized particles of polishing agents provide the aqueous waste with a high solids content which, in turn, imparts a sludge-like nature to the aqueous waste.

Figure 1:
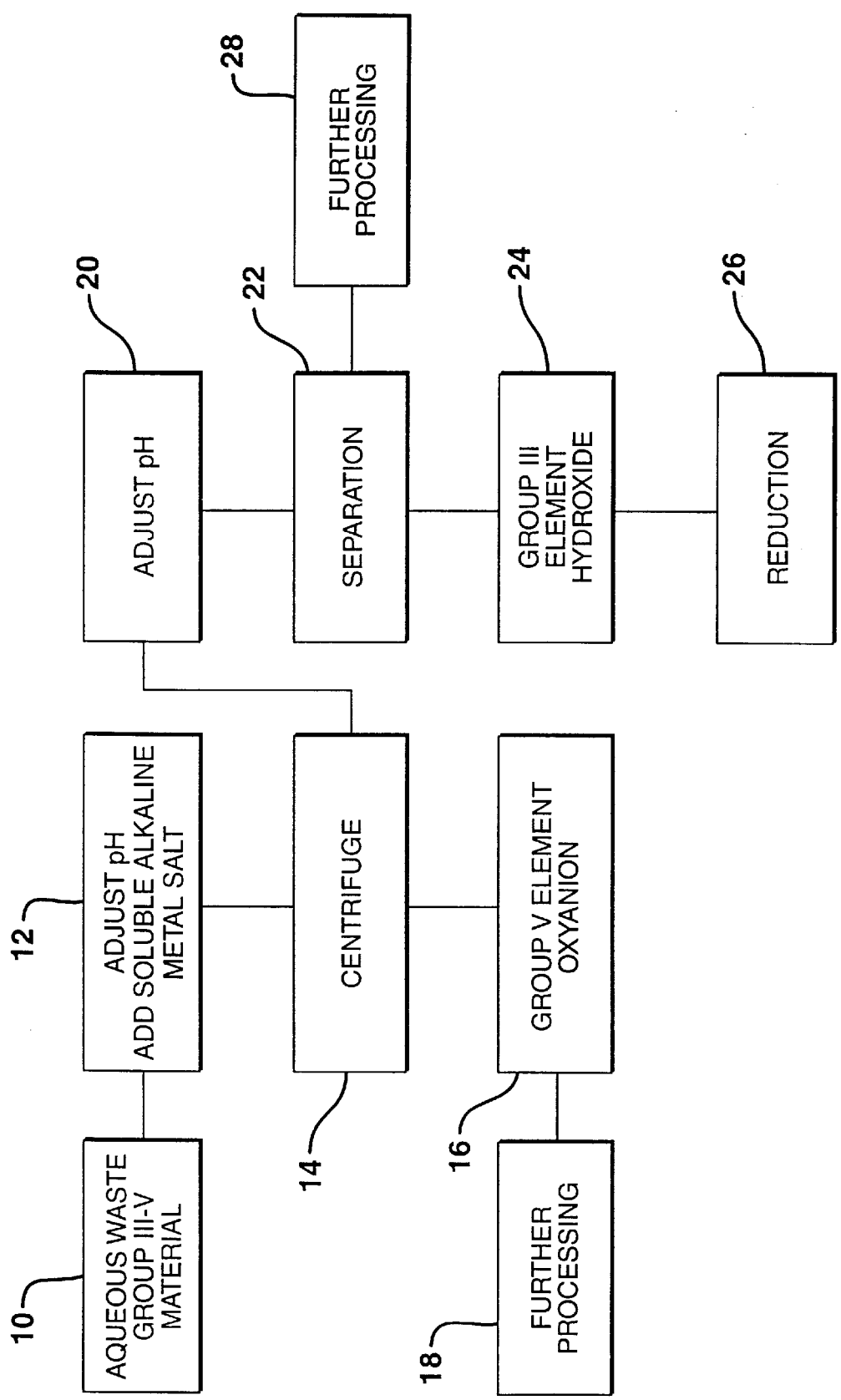
FIG. 1 presents a flow diagram of the separation process for separating a group III element from a group III-V material.

One method of this invention for the recovery of a group III element from an aqueous waste containing group III-V material, see 10, is shown in FIG. 1. To begin the recovery process, the aqueous waste containing the group III-V material is subjected to a pH adjustment to the basic region, see 12. The pH of the aqueous waste is adjusted to a pH of from about 9.5 to about 12.5 through the addition of an alkali metal hydroxide base to the aqueous waste. Desirably, the pH of the aqueous waste is adjusted to from about 10.5 to about 12. In this pH region, the alkali portion of the alkali metal hydroxide base forms a soluble metal salt with the group III element. These metal salts of the group III elements remain in solution in the aqueous waste while the group V elements are being precipitated. Useful alkali metal hydroxide bases include sodium hydroxide, potassium hydroxide, and lithium hydroxide. Desirably, sodium hydroxide is used to increase the pH of the aqueous waste because it forms the most soluble alkali metal-group III element salt; and it is the lowest cost of the alkali metal hydroxides.

The group V elements are precipitated by means of forming a group V element oxyanion with an alkaline metal. Group V element oxyanions formed with alkaline metals are insoluble at pH's from about 9.5 to about 12.5 and, upon formation, will precipitate out of the aqueous waste in that pH range. The source of the alkaline metal is a water soluble alkaline metal salt which is added to the aqueous waste after the pH of the aqueous waste has been adjusted to the alkaline region, see 12. To effectively precipitate the group V element, the alkaline metal salt is added to the aqueous waste in an amount such that it bonds with most, if not all, of the group V element. Desirably, the alkaline metal salt is provided in an alkaline metal-to-group V element concentration ratio of about 2:1. A concentration ratio of about 2:1 is used to ensure that most, if not all, of the group V element reacts with the alkaline metal. A concentration ratio as high as about 5:1 can be used, however, it is desirable that a ratio as close as possible to 2:1 be used so that as little additional volume as possible is added to the formed precipitate. One skilled in the art will appreciate that higher ratios than 5:1 may be used but such ratios will unduly increase the volume of the formed precipitate. Useful alkaline metal salts include calcium chloride and magnesium chloride, calcium and magnesium nitrate, calcium and magnesium acetate, and magnesium sulfate. Desirably, the alkaline metal salt is calcium chloride.

To decrease the volume of the precipitate/polish sludge formed from the aqueous waste, the aqueous waste can be heated after the alkaline metal salt is added to the aqueous waste. The aqueous waste can be heated to a temperature from about 30° C. to about 95° C. and, desirably, from about 35° C. to about 50° C. However, such a heating step is neither necessary nor required.

Once the group V element oxyanion has been precipitated, it and a majority of the suspended polish are separated from the aqueous waste. Because of the sludge-like nature of the aqueous waste at this time and the fine particle size of the suspended polish, the group V element oxyanion and the polish are separated from the aqueous waste by means of a centrifuge, see 14. This separation produces a "dry" sludge containing the group V element oxyanion and polishing agent, see 16. By "dry," it is meant that the solution has a solids content of from about 4% to about 12%. Most of the polishing agent settles out of the aqueous waste at this time as a result of the centrifuging action. It should be noted that centrifuging of the solution prior to the precipitation of the group V element oxyanion will not achieve separation of the polish.

The recovered group V element oxyanion can then be subjected to further recovery steps, such as being subjected to a reducing agent, to produce an elemental group V element which can be recycled into the group III-V material manufacturing process or can be disposed of, see 18. The group V element oxyanion may also be used for any other purpose for which it is useful. If the group V element oxyanion is nontoxic, such as, for example, calcium phosphate, then the oxyanion is simply disposed of. On the other hand, if the group V element oxyanion includes arsenic, then the arsenic is recovered and recycled into the group III-V material manufacturing process.

To recover the group III element in the aqueous waste, the aqueous waste is subjected to a second pH adjustment to lower the pH of the aqueous waste to the neutral region, see 20. Desirably, the pH of the aqueous waste is adjusted to from about 6 to about 8. The pH of the aqueous waste is lowered through the use of a mineral acid such as sulfuric acid, hydrochloric acid, hydrofluoric acid or nitric acid. Useful waste acids include sulfuric acid, hydrochloric acid, hydrofluoric acid or nitric acid. Of these acids, hydrofluoric acid is most desirable. Desirably, if the aqueous waste is derived from a semiconductor wafer polishing process, then waste acids generated during other semiconductor manufacturing steps, such as etching or cleaning, can be used to provide the second pH adjustment.

At a pH near the neutral region, and, particularly, a pH from about 6 to about 8, insoluble hydroxide precipitates of the group III elements form. The hydroxide precipitates are removed from the aqueous waste by either centrifuging or filtering, see 22. Because of the reduced solids content of the aqueous waste at this time in the process, either method of separation is acceptable. The filtering can be performed using any conventional filtering device. It has been found that a filter having a pore diameter of about 0.1 micron to about 0.5 micron is useful.

The recovered hydroxide precipitate of the group III element is then subjected to a reduction reaction to produce a group III element, see 26. The group III element hydroxide is reduced by flowing hydrogen gas over the recovered filtrate while raising the temperature of the filtrate. The group III element hydroxides may also be reduced through the addition of sodium borohydride to the recovered filtrate or by a conventional reduction reaction using carbon.

The remainder of the aqueous waste is then processed by a conventional process, such as treatment with a soluble ferric iron species, to further reduce the content of any toxic metal in the aqueous waste before the aqueous waste is processed to a publicly owned treatment works, such as a sewage treatment plant, see 28.

Figure 2:
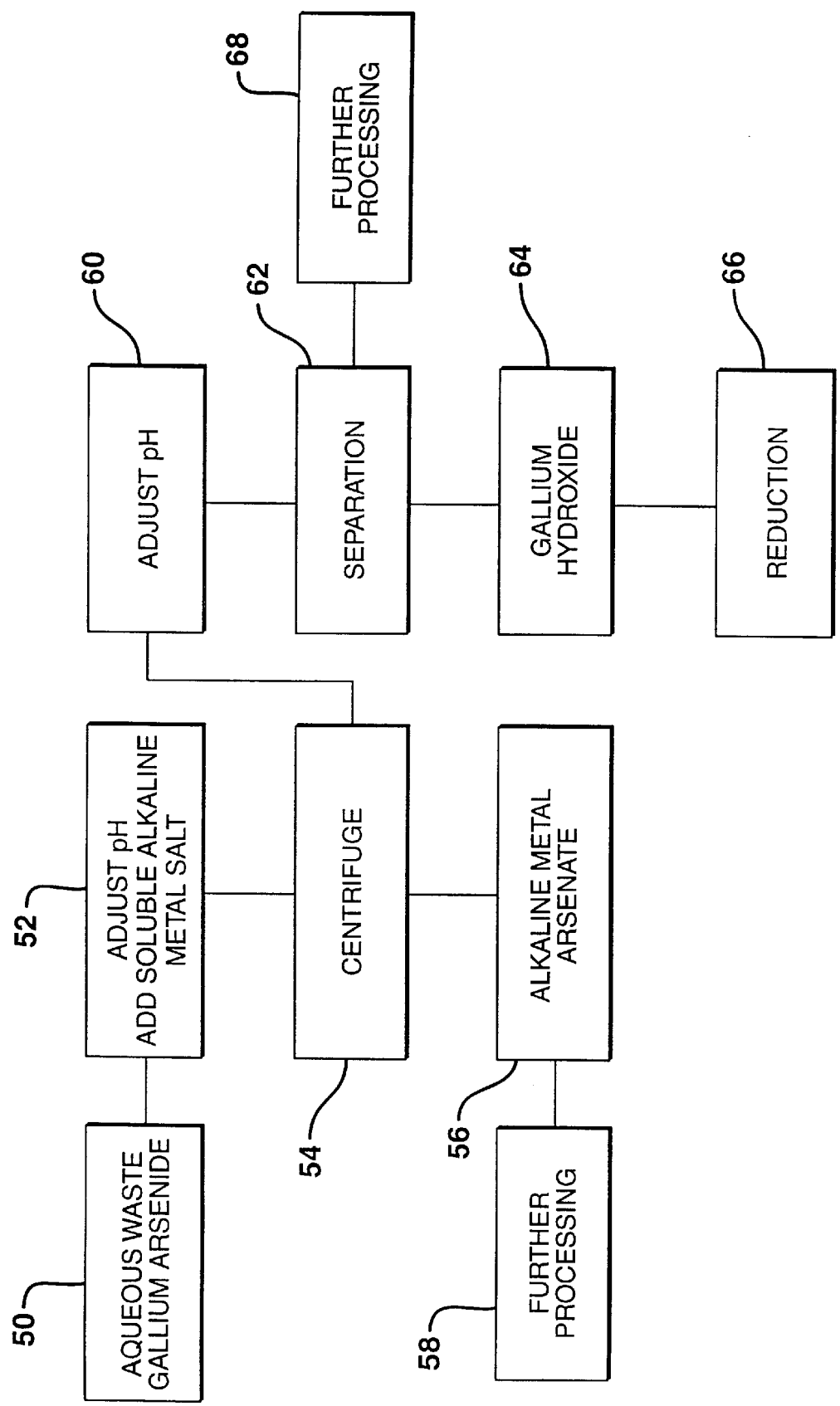
FIG. 2 presents a flow diagram of the separation process for separating gallium from gallium arsenide.

FIG. 2 presents a flow diagram or a preferred method of the present invention, which is directed to a process for the recovery of gallium and arsenic from an aqueous waste containing gallium arsenide in a solubilized form, see 50. In this method, the pH of the aqueous waste is adjusted to a pH from about 9.5 to about 12.5 by means of an alkali metal hydroxide base such as that described above, see 52. Desirably, the pH is adjusted to from about 10.5 to about 12. The alkali portion of the alkali metal hydroxide base forms a soluble metal salt with gallium which remains in solution as the arsenic is being precipitated.

The arsenic is precipitated out of solution by adding an alkaline metal salt to the aqueous waste, see 52. Desirably, the alkaline metal salt is added to the aqueous waste in a concentration ratio of alkaline metal-to-arsenic of about 2:1. In addition, it is desirable that the added alkaline metal salt be a soluble salt of calcium. The alkaline metal of the alkaline metal salt causes the formation of an alkaline metal arsenate, such as calcium arsenate or magnesium arsenate, which precipitates out of the aqueous waste. The aqueous waste can be heated to a temperature from about 30° C. to about 95° C. after the alkaline metal is added to the aqueous waste. More desirably, the aqueous waste can be heated to from about 35° C. to about 50° C. Once the alkaline metal arsenate has been precipitated, it and a majority of the polish are then separated from the aqueous waste through the use of a centrifuge, see 54. As described above, a centrifuge is used because of the sludge-like nature of the aqueous waste and the fine particle size of the polish at this point in the process.

Once the alkaline metal arsenate has been separated from the aqueous waste, see 56, the arsenic is then recovered from the alkaline metal arsenate, see 68. One method for recovering arsenic from the alkaline metal arsenate precipitate is the following. The alkaline metal arsenate precipitate is fed into a reactor along with silica and carbon. The reactor is then heated. Upon heating, the arsenic is reduced by the carbon to an elemental state, with the subsequent evolution of arsenic vapor and carbon oxides. The arsenic vapor is condensed out of the resultant gas steam in a conventional condensing apparatus to form solid elemental arsenic. The silica converts the alkaline metal portion of the arsenate precipitate to a nonvolatile silicate slag. The recovered elemental arsenic is then recycled into the group III-V material manufacturing process and the silicate slag is disposed of. Although hydrogen is a common reducing agent, one of skill in the art will appreciate that hydrogen cannot be used to reduce the arsenic precipitate because the hydrogen and arsenic will form arsine gas, which is toxic and lethal.

Once the alkaline metal arsenate has been precipitated from the aqueous waste, the aqueous waste is then further processed to remove gallium. Gallium is removed from the aqueous waste by reducing the pH of the aqueous waste to from about 6 to about 8 through the use of a mineral acid, such as those described above, see 60. Again, it is desirable to use waste acids generated during a wafer etching process. Upon changing the pH, the gallium is precipitated out of the aqueous waste as gallium hydroxide. This gallium hydroxide is then separated from the aqueous waste either by filtering or centrifuging, see 62. The gallium is then recovered from the gallium hydroxide, see 64, through a reduction reaction, see 66. The gallium is reduced in the manner described above for the reduction of the group III element hydroxide.

The remainder of the aqueous waste stream can then be subjected to further treatment to further reduce the content of group III elements and group V elements, see 68. A treatment process, such as treatment with a soluble ferric iron species, can be used.

Figure 3:
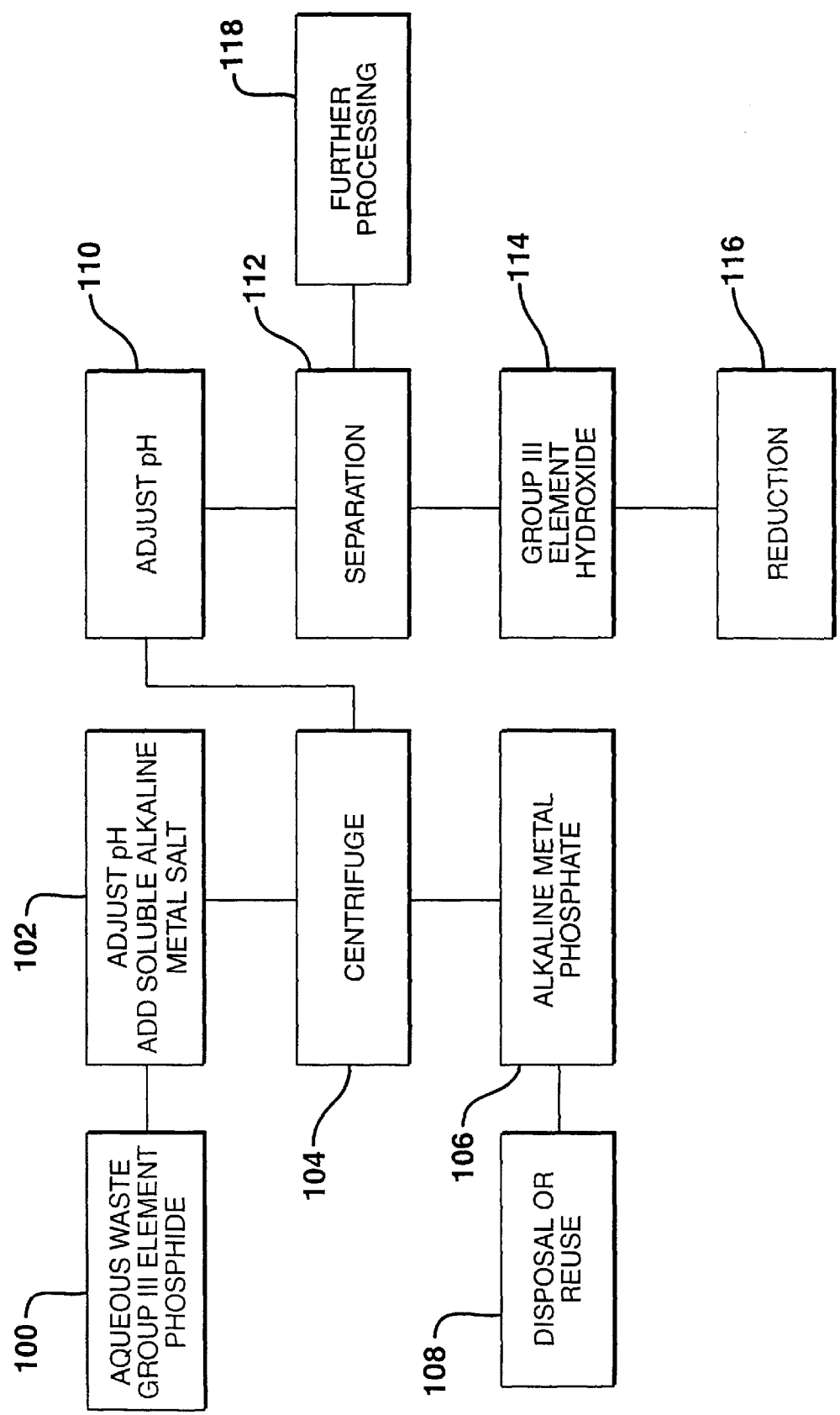
FIG. 3 presents a flow diagram of the separation process for separating a group III elemental component from a group III element phosphide.

Another preferred method of the present invention is shown in FIG. 3 and is directed to a process for the recovery of a group III element from an aqueous waste containing a group III element phosphide, such as gallium phosphide or indium phosphide, in a solubilized form, see 100. In this aspect of the process, the pH of the aqueous waste is adjusted to a pH from about 9.5 to about 12.5 by means of an alkali metal hydroxide base such as that described above, see 102. Desirably, the pH of the aqueous waste is adjusted to from about 10.5 to about 12. The alkali portion of the alkali metal hydroxide base forms a soluble metal salt with the group III element which remains in solution as the phosphorus is being precipitated.

The phosphorus is precipitated out of the aqueous waste by adding an alkaline metal salt to the aqueous waste, see 102. Desirably, the alkaline metal salt is added to the aqueous waste in an alkaline metal-to-phosphorus concentration ratio of about 2:1. In addition, it is desirable that the alkaline metal salt be a water soluble salt of magnesium or calcium. The alkaline metal of the alkaline metal salt causes the formation of an alkaline metal phosphate which precipitates out of the aqueous waste once the pH of the aqueous waste is adjusted to the basic region. The aqueous waste can be heated to a temperature from about 30° C. to about 95° C. to reduce the volume of the formed precipitate/polish sludge after the alkaline metal salt has been added to the aqueous waste. More particularly, the aqueous waste can be heated to from about 35° C. to about 50° C. The alkaline metal phosphate precipitate and a majority of the polish are then separated from the aqueous waste through the use of a centrifuge, see 104. As described above, a centrifuge must be used because of the sludge-like nature of the aqueous waste at this point in the process.

Once the alkaline metal phosphate is recovered, see 106, it can either be disposed of, reused as a fertilizer or used for any other use for which an alkaline metal phosphate is used, see 108.

Once the alkaline metal phosphate has been removed from the aqueous waste, the aqueous waste is then further processed to remove the group III element. The group III element is removed from the aqueous waste by reducing the pH of the aqueous waste to from about 6 to about 8 through the use of a mineral acid, such as those described above, see 110. Again, it is desirable to use the waste acids from other manufacturing processes. Upon changing the pH, the group III element precipitates out of the aqueous waste as a group III element hydroxide. The group III element hydroxide is then separated from the aqueous waste either by filtering or centrifuging, see 112.

The group III element is then recovered from the group III element hydroxide, see 114, through a reduction reaction, see 116. The group III element hydroxide is reduced in the same manner as described above for the reduction of the group III element hydroxide in the process relating to the recovery of a group III element from a group III-V material.

The remainder of the aqueous waste is then subjected to further treatment to further remove any residual trace of group III elements and/or phosphorus, see 118. The further treatment can be conducted in any conventional manner.

Having described the invention in detail and by reference to desired embodiments thereof, it will be apparent that modifications and variations to the invention are possible without departing from the scope of the invention which is defined in the appended claims.

What is claimed is:

1. A method for separating a group III element from an aqueous waste containing group III-V material comprising the following steps in the order indicated:

adjusting the pH of an aqueous waste containing a group III-V material to a pH from about 9.5 to about 12.5 by adding an alkali metal hydroxide base to said aqueous waste;

precipitating a group V element oxyanion by adding an alkaline metal salt to said aqueous waste;

separating said group V element oxyanion from said aqueous waste;

adjusting the pH of said aqueous waste to form a group III element hydroxide precipitate by adding a mineral acid to said aqueous waste;

separating said group III element hydroxide precipitate from said aqueous waste; and recovering said group III element from said group III element hydroxide precipitate.

2. The method of claim 1 wherein said pH of said aqueous waste is adjusted to a pH from about 10.5 to about 12.

3. The method of claim 2 wherein said alkaline metal salt is added to said aqueous waste in a concentration ratio of alkaline metal-to-group V element of about 2:1.

4. The method of claim 3 wherein said group III element hydroxide precipitate is formed by adjusting the pH of said aqueous waste to a pH from about 6 to about 8.

5. The method of claim 4 wherein said mineral acid is selected from the group consisting of sulfuric acid, hydrochloric acid, hydrofluoric acid and nitric acid.

6. The method of claim 5 wherein said step of precipitating a group V element oxyanion further includes the step of heating said aqueous waste after adding said alkaline metal salt to said aqueous waste.

7. The method of claim 6 wherein said aqueous waste is heated to from about 30° C. to about 95° C.

8. The method of claim 7 wherein said aqueous waste is heated to from about 35° C. to about 50° C.

9. The method of claim 1 wherein said step of recovering said group III element from said group III element hydroxide precipitate includes reducing said group III element hydroxide precipitate with a reducing agent to produce a group III element.

10. The method of claim 1 further including the step of recovering said group V element from said group V element oxyanion.

11. The method of claim 1 wherein said alkali metal hydroxide base is selected from the group consisting of lithium hydroxide, potassium hydroxide and sodium hydroxide.

12. The method of claim 1 wherein said group V element oxyanion is separated from said aqueous waste by centrifuging.

13. The method of claim 1 wherein said group III element hydroxide precipitate is separated from said aqueous waste by filtering or centrifuging.

14. The method of claim 1 comprising obtaining said mineral acid as a waste acid from a process of manufacturing a group III-V material.

15. A method for the separation of gallium from an aqueous waste containing gallium arsenide comprising the following steps in the order indicated:

adjusting the pH of an aqueous waste containing gallium arsenide to a pH from about 9.5 to about 12.5 by adding an alkali metal hydroxide base;

precipitating an alkaline metal arsenate by adding an alkaline metal salt to said aqueous waste;

separating said alkaline metal arsenate from said aqueous waste;

adjusting the pH of said aqueous waste to form a gallium hydroxide precipitate by adding a mineral acid to said aqueous waste;

separating said gallium hydroxide precipitate from said aqueous waste; and recovering gallium from said gallium hydroxide precipitate.

16. The method of claim 15 herein said step of precipitating an alkaline metal arsenate further includes the step of heating said aqueous waste after said alkaline metal salt has been added to said aqueous waste.

17. The method of claim 16 wherein said aqueous waste is heated to from about 30° C. to about 95° C.

18. The method of claim 17 wherein said aqueous waste is heated to from about 35° C. to about 50° C.

19. The method of claim 18 wherein said alkaline metal salt is added to said aqueous waste in a concentration ratio of alkaline metal-to-arsenic of about 2:1.

20. The method of claim 15 wherein said step of recovering gallium from said gallium hydroxide precipitate includes reducing said gallium hydroxide precipitate with a reducing agent to produce gallium metal.

21. The method of claim 15 further including the step of recovering arsenic from said alkaline metal arsenate.

22. The method of claim 21 wherein the step of recovering arsenic from said alkaline metal arsenate includes:

placing said alkaline metal arsenate in a reactor;

adding a source of carbon to said reactor:

heating said reactor to cause said alkaline metal arsenate to be reduced to cause arsenic gas and carbon oxides to be evolved;

collecting said arsenic gas; and condensing said arsenic gas to produce elemental arsenic.

23. The method of claim 15 wherein said alkali metal hydroxide base is sodium hydroxide.

24. The method of claim 15 wherein said alkaline metal arsenate is separated from said aqueous waste by centrifuging.

25. The method of claim 15 wherein said gallium hydroxide precipitate is separated from said aqueous waste by filtering or centrifuging.

26. The method of claim 15 wherein said gallium hydroxide precipitate is formed by adjusting the pH of said aqueous waste to a pH from about 6 to about 8.

27. The method of claim 15 wherein said mineral acid is selected from the group consisting of sulfuric acid, hydrochloric acid, hydrofluoric acid and nitric acid.

28. The method of claim 27 comprising obtaining said mineral acid as a waste acid from a process of manufacturing a gallium arsenide semiconductor.

29. The method of claim 15 wherein said pH of said aqueous waste containing gallium arsenide is adjusted to a pH from about 10.5 to about 12.

30. A method for the separation of a group III element from an aqueous waste containing a group III element phosphide comprising the following steps in the order indicated:

adjusting the pH of an aqueous waste containing a group III element phosphide to a pH from about 9.5 to about 12.5 by adding an alkali metal hydroxide base;

precipitating an alkaline metal phosphate by adding an alkaline metal salt to said aqueous waste;

separating said alkaline metal phosphate from said aqueous waste;

adjusting the pH of said aqueous waste to form a group III element hydroxide precipitate by adding a mineral acid to said aqueous waste;

separating said group III element hydroxide precipitate from said aqueous waste; and recovering a group III element from said group III metal hydroxide precipitate.

31. The method of claim 30 wherein said step of precipitating an alkaline metal phosphate further includes the step of heating said aqueous waste after said alkaline metal salt has been added to said aqueous waste.

32. The method of claim 31 wherein said aqueous waste is heated to from about 30° C. to about 95° C.

33. The method of claim 32 wherein said aqueous waste is heated to from about 35° C. to about 50° C.

34. The method of claim 30 wherein said alkaline metal salt is added to said aqueous waste in a concentration ratio of alkaline meal-to-phosphorus of about 2:1.

35. The method of claim 30 wherein said recovering of said group III element from said group III element hydroxide precipitate includes reducing said group III element hydroxide precipitate with a reducing agent to produce a group III element.

36. The method of claim 30 wherein said hydroxide base is sodium hydroxide.

37. The method of claim 30 wherein said alkaline metal phosphate is separated from said aqueous waste by centrifuging.

38. The method of claim 30 wherein said group III element hydroxide precipitate is formed by adjusting the pH of said aqueous waste to a pH from about 6 to about 8.

39. The method of claim 30 wherein said group III element hydroxide precipitate is separated from said aqueous waste by filtering or centrifuging.

40. The method of claim 30 comprising obtaining said mineral acid as waste acid from a process of manufacturing a group III element phosphide semiconductor.

41. The method of claim 30 wherein said mineral acid is selected from the group consisting of sulfuric acid, hydrochloric acid, hydrofluoric acid and nitric acid.

42. The method of claim 30 wherein said pH of said aqueous waste containing group III element phosphide is adjusted to a pH from about 10.5 to about 12.

\* \* \* \* \*